Patented Nov. 8, 1932

1,886,773

UNITED STATES PATENT OFFICE

HARRY A. WINNE, OF SCHENECTADY, NEW YORK, ASSIGNOR TO GENERAL ELECTRIC COMPANY, A CORPORATION OF NEW YORK

MOTOR CONTROL SYSTEM

Application filed February 24, 1930. Serial No. 430,485.

My invention relates to systems of motor control, more particularly to a field protective system for electric motors, and has for its object to provide adequate over-speed protection which will not function under abnormal operation unless there is present a real danger of over-speeding.

Various systems have been proposed to protect a motor from over-speeding due to weakened field excitation. Usually these systems employ a relay having its operating coil responsive to variations in the shunt field current of the motor with connections whereby when the shunt field current decreases for any reason to a predetermined value, the relay operates and disconnects the motor from the line. I have found, however, that under certain conditions, particularly in the case of a motor having both shunt and series fields, the value of the shunt field current is not a true indication of the field flux condition in the motor and therefore that a protective device responsive to the shunt field current alone may operate when a low value of field flux, against which the device is intended to give protection, does not exist. For example, with a cumulative compound motor a sudden increase in armature current from any cause, such as might be due to a sudden increase in load or to a reversal of the motor armature, produces a corresponding increase in the series field current which in turn increases the field flux in the motor. This sudden increase in field flux produces a counter-electromotive force in the shunt field winding which opposes the existing electromotive force in the shunt field winding. As a result of this induced counter-electromotive force in the shunt field windings, the current in the shunt field winding may be temporarily reduced to a very considerable extent even though the total field flux has actually increased due to the effect of the series winding. In case the shunt field current is reduced by this action to the minimum value to which a protective relay responsive only to this current is set, the relay would thus operate to disconnect the motor even though the motor field flux were still adequate for satisfactory operation.

In accordance with my invention I provide means for controlling the motor in response to the field flux conditions actually existing in the motor. In one form of my invention I reproduce the flux conditions in the motor in an auxiliary control device such as a relay having a plurality of coils, one of which is in series with the shunt field winding and the other in series with the series field winding, whereby the relay is operated to break the circuit of the motor when the total flux in the relay has dropped to a predetermined value. It will be understood that my invention is not limited to the reproduction of the flux conditions by a relay alone but obviously includes the arrangement of a relay with respect to the motor so that the relay is responsive to the motor flux.

My invention will be better understood and further objects will become apparent from a study of the following description taken in conjunction with the accompanying drawing, the single figure of which is a diagrammatic representation of a system of motor control embodying my invention.

Referring to the drawing, I have shown my invention in one form as embodied in a control system wherein a motor 10 having a cumulative series field 11 and a shunt field winding 12 may be connected through reversing switches 13 and 14 to the supply line 5. The switches 13 and 14 are actuated by windings 15 and 16 which are energized from a controller 17. Interposed in the series field circuit is a coil 18 on a relay 20 and a coil 19 on the relay is similarly interposed in series with the shunt field circuit, these two coils acting to assist each other.

The flux in the motor, of course, is substantially dependent on the magnitude of the current flowing through its field windings, and the coils 18 and 19 are so arranged and proportioned that the flux condition existing in the motor is approximately reproduced in the relay by the coils.

The circuits may be traced by first considering the controller 17 in a position such that the movable segments 21 engage with contacts 22 and 23, the line switch 5ª being closed. It is to be noted that the shunt field winding 12 and the coil 19 are permanently connected across the line so that the relay 20 is normally maintained closed by the coil 19. The circuit may now be traced through the conductor 24, the relay contacts 25 and 26 which are bridged by means of member 27, through wire 28 to the controller contact 22, through the segments 21 to contact 23, the conductor 28—A, the coil 16 and through wire 29 to the other side of the line. The switch 14 is then closed by the coil 16 and completes the circuit to the armature of the motor, which circuit may be traced from the positive side of the line through conductor 30, the relay coil 18, series field 11, and conductor 31 to one side of switch 14, thence through conductor 32 to the armature of the motor and conductor 33, the other side of switch 14, and conductor 34 to the other side of the line.

When the operator wishes to reverse the motor, the controller 17 is moved so that segments 35 engage contacts 22 and 36 completing a circuit through the coil 15 which closes the switch 13 to complete a circuit to the motor armature with the polarity of the current reversed.

With this arrangement it will be observed that upon a sudden surge of armature current such as might arise from a sudden application of load or from a reversal of the motor before its armature has come to rest, the motor field flux conditions are closely reproduced in the relay 20 and consequently the relay will be held in the closed position as long as the motor has an adequate field flux for safe running conditions While the current in the relay coil 19 may be greatly reduced temporarily due to the counter-electromotive force induced in the shunt field winding 12 as well as in the relay winding 19 itself, the field flux in the motor may still be sufficient for safe running due to the effect of the series field. This condition is substantially duplicated in the relay due to the effect of the relay winding 18 and consequently the relay does not operate. A motor field flux less than a predetermined minimum for which the relay is arranged causes the relay to drop out, however, and deenergize the motor.

While I have described a particular embodiment of my invention, and certain apparatus therefor it will be obvious to those skilled in the art that various modifications may be made without departing from the spirit of my invention. I therefore desire to cover all such modifications as fall within the scope of my invention which is set forth in the appended claims.

What I claim as new and desire to secure by Letters Patent of the United States is:

1. The combination with a motor provided with shunt and series field windings, of means operated in accordance with the total flux produced by said windings after the motor has been accelerated to a running speed for controlling said motor.

2. The combination with a dynamo electric machine provided with shunt and series field windings, of a control device therefor provided with a pair of actuating coils permanently connected respectively in circuit with said field windings so as to substantially reproduce the field flux conditions of said motor in said control device.

3. The combination with an electric motor provided with shunt and series field windings, of a protective relay for controlling the energization of said motor, and a pair of actuating coils for said relay connected respectively in series with said field windings during running operation of said motor so as to substantially reproduce the field flux conditions of said motor in said relay, and thereby cause said relay to deenergize said motor upon the occurrence of a motor field of a predetermined low value.

4. In a protective device for a motor having shunt and series field windings, means for reversing the direction of current flow to the armature circuit to reverse the rotation of the motor, and means responsive to the flux produced in the motor by said field winding during running operation of said motor for controlling said reversing means to deenergize the motor when the total flux decreases to a predetermined low value.

5. The combination with an electric motor provided with a shunt field winding and a series field winding, switching means for controlling the energization of said motor for each direction of rotation, a control device for said switches, and operating coils for said control device connected respectively in circuit with said field windings so as to simulate the field conditions in said motor during running operation of said motor and release said control device upon the occurrence of predetermined low field strengths.

6. The combination with an electric motor provided with a shunt field winding and a series field winding, electromagnetically actuated reversing switches for controlling the energization of said motor, a control circuit for said switches, a relay switch in said control circuit, and actuating coils for said relay permanently connected respectively in series with said field windings and arranged to simulate the field flux conditions in said motor so as to release said relay and open said control circuit upon the occurrence of a predetermined low field flux strength.

7. The combination with a motor provided with shunt and series field windings, of circuit control means for said motor and means operated in accordance with the total flux produced by said field windings during running operation of said motor for controlling said circuit control means to deenergize said motor upon the occurrence of a predetermined reduced motor field.

8. The combination with an electric motor provided with shunt and series field windings, of a control device for said motor provided with windings permanently connected in series with said field windings respectively, said windings being arranged to jointly release said relay to deenergize said motor upon the occurrence of a predetermined weakened motor field.

In witness whereof, I have hereunto set my hand this 22nd day of February, 1930.

HARRY A. WINNE.